United States Patent [19]

Taylor

[11] Patent Number: 4,793,451

[45] Date of Patent: Dec. 27, 1988

[54] ENERGY ABSORBER DEVICE WITH PLASTIC CASING AND SCREW-IN PLASTIC SEAL

[75] Inventor: Paul H. Taylor, Grand Island, N.Y.

[73] Assignee: Tayco Developments, Inc., North Tonawanda, N.Y.

[21] Appl. No.: 419,174

[22] Filed: Sep. 17, 1982

[51] Int. Cl.⁴ .......................... F16F 5/00; F16F 9/10; F16F 9/36; F16F 9/38

[52] U.S. Cl. ................................ 188/316; 188/322.12; 188/322.17; 188/322.19; 267/64.11; 267/64.13; 267/64.19; 267/118; 277/33; 277/205; 277/237 R; 403/343

[58] Field of Search ............... 188/269, 297, 298, 311, 188/312, 313, 314, 315, 316, 317, 318, 319, 320, 322.16, 322.17, 322.18, 322.19, 322.21, 322.12; 267/8 R, 64.11, 64.15, 64.13, 64.26, 64.27, 118, 120, 129, 136, 140.1; 277/33, 205, 257 R; 285/114; 403/343

[56] References Cited

U.S. PATENT DOCUMENTS

| | | | |
|---|---|---|---|
| 2,141,541 | 12/1938 | Levy | 188/312 |
| 3,256,005 | 6/1966 | Taylor | 277/205 |
| 3,343,833 | 9/1967 | Fader | 188/269 |
| 3,618,928 | 11/1971 | Taylor | 188/315 |
| 4,012,061 | 3/1977 | Olson | 285/114 |
| 4,064,977 | 12/1977 | Taylor | 267/64.11 |
| 4,265,344 | 5/1981 | Taylor | 188/322.17 |

FOREIGN PATENT DOCUMENTS

| | | | |
|---|---|---|---|
| 1265599 | 4/1968 | Fed. Rep. of Germany | 267/64.15 |
| 992347 | 10/1951 | France | 267/64.15 |
| 1283065 | 12/1961 | France | 188/322.19 |

*Primary Examiner*—George E. A. Halvosa
*Attorney, Agent, or Firm*—Joseph P. Gastel

[57] ABSTRACT

An energy absorber device including a plastic cylinder having a smaller and larger diameter portion with a shoulder at the junction therebetween, a screw-in plastic seal at one end of the casing surrounding a piston member, a metal housing having smaller and larger diameter portions for sliding engagement with the smaller and larger diameter portions of the casing and having a shoulder for abutting engagement with the shoulder on the casing, and an abutment member carried by the housing for engaging the outer end of the piston member.

13 Claims, 1 Drawing Sheet

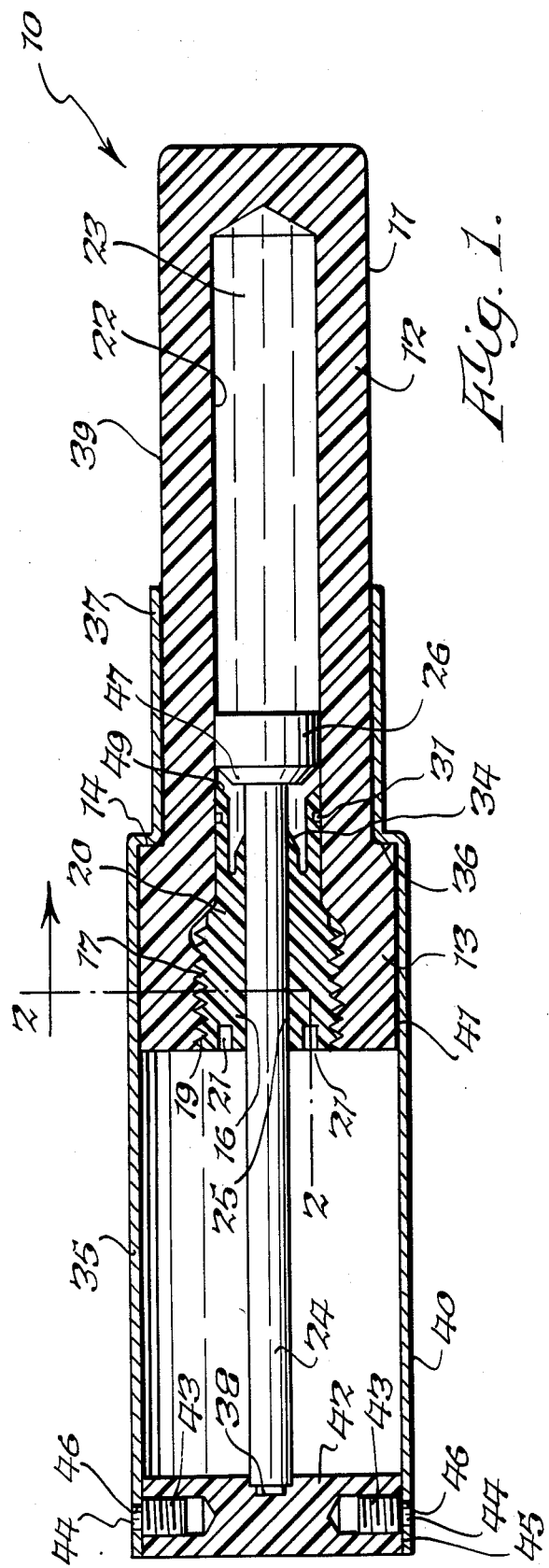
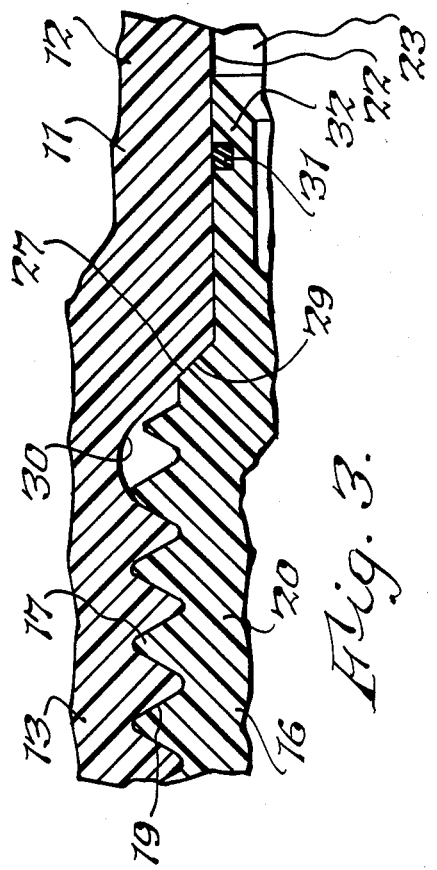
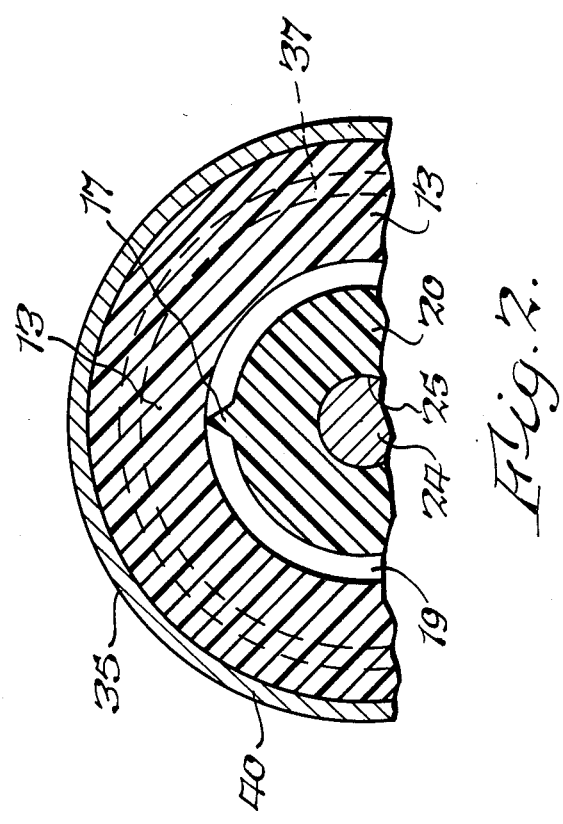

ENERGY ABSORBER DEVICE WITH PLASTIC CASING AND SCREW-IN PLASTIC SEAL

BACKGROUND OF THE INVENTION

The present invention relates to an improved fluid energy absorber device, such as a fluid spring or shock absorber, or combination of both, having a plastic casing and a separate screw-in plastic seal for the piston thereof.

A fluid energy absorber device having a plastic casing is shown in U.S. Pat. No. 3,618,928, and one having an integral molded seal is disclosed in U.S. Pat. No. 4,265,344.

The mold for molding a plastic casing for a fluid energy absorber device with an integral seal, such as shown in U.S. Pat. No. 4,265,344, is relatively expensive. Before a plastic energy absorber device of this type can be placed in use, it must be extensively tested. If changes are required, as a result of information obtained from the testing, the modification of the mold can involve considerable additional expense. Furthermore, the cost of the mold for energy absorber devices with plastic casings and integral molded seals is prohibitively high for short production runs.

In addition, some environments in which energy absorber devices are used are abrasive in nature, which will result in a short seal life, while the cylinder will still have a long life. Replaceable seals are desirable in these applications. It is with solving the foregoing problems that the present invention is concerned.

SUMMARY OF THE INVENTION

It is accordingly one object of the present invention to provide an improved fluid energy absorber device construction having a molded plastic casing with a screw-in plastic seal, (1) to permit testing of the seal without requiring the fabrication of an expensive mold for a casing having an integral seal, and (2) to also provide a fluid energy absorber device which is economical for short-run production, by eliminating the necessity for a complex and expensive mold.

An important object of this invention is to provide a liquid spring shock cylinder with a screw-in plastic seal which enables expedient experimentation with variations in liquid spring piston areas and related energy storage capabilities for the determination of the parameters for optimum material and performance of the liquid spring shock by changing the screw-in plastic seal and related piston.

Another object of the present invention is to provide a high stress capability plastic cylinder for long cycle life with a screw-in plastic seal having a superior sealing capability of a different plastic.

Yet another object is to provide a plastic spring which is not a throwaway when the seal is worn because of a separate seal replacement capability.

Another object of the present invention is to provide an improved fluid energy absorber device having a plastic casing, and a metal housing mounted thereon for preloading the device and guiding the piston in a perfectly rectilinear path.

A further object of the present invention is to provide an improved fluid energy absorber device having a plastic casing which has a greater amount of plastic located at an area where a threaded seal is located, thereby conserving plastic in the remainder of the casing where this amount of plastic is not needed and which is the size of a subsequently molded cylinder with an integral seal. A related object is to provide a shoulder at the junction of larger and smaller diameter portions of the casing for anchoring the metal housing which secures the outer end of the piston.

Yet another object of the present invention is to provide an improved fluid energy absorber device having a plastic casing which can receive plastic seals of various sizes, thereby permitting the customizing of plastic fluid energy absorber devices from standard parts. Other objects and attendant advantages of the present invention will readily be perceived hereafter.

The present invention relates to an energy absorber device comprising a plastic cylinder having first and second ends, first means closing said first end, a plastic seal member having external threads thereon, internal threads at said second end for receiving said external threads, fluid in said cylinder, piston means, and a bore in said plastic seal member for receiving said piston means. The various aspects of the present invention will be more fully understood when the following portions of the specification are read in conjunction with the accompanying drawings wherein:

BRIEF DESCRIPTION OF THE DRAWINGS

FIG. 1 is a cross sectional view of the improved plastic fluid energy absorber device of the present invention;

FIG. 2 is a fragmentary cross sectional view taken substantially along line 2—2 of FIG. 1; and FIG. 3 is an enlarged fragmentary view of a portion of FIG. 1 showing the configuration in the area of the threads.

DESCRIPTION OF THE PREFERRED EMBODIMENTS

The improved fluid energy absorber device is shown at 10 in FIG. 1. The fluid energy absorber device 10 may be a fluid spring or a fluid shock absorber, or a combination of both, and the fluid utilized therein may be a liquid or a gas or a combination of both. If the device is to be a fluid spring, it may contain a compressible liquid, such as silicone liquid. If it is to be a shock absorber, it may contain conventional shock absorber fluid. Accordingly, the designation "fluid energy absorber device" will encompass all of the foregoing.

Energy absorber device 10 includes a molded or machined cylindrical plastic casing 11 having a smaller diameter section 12 which is adjacent to a larger diameter cylindrical section 13. An annular shoulder 14 is formed at the junction of casing sections 12 and 13. End portion 13 is integral with casing section 12. Casing 11 can be made of a plastic suitable for maximum reversals or cycle life which is not necessarily a good plastic for sealing the specific liquid to be used in the device. Thus, a glass reinforced plastic cylinder could be employed for the casing, which if used for the seal would abrade the piston rod inducing breakage and providing a short life.

In accordance with one aspect of the present invention, a screw-in plastic seal 16 is provided having external threads 17 thereon which are received by internal threads 19 in casing section 13. Seal 16 includes a body portion 20 having a pair of spaced bores 21 therein for receiving a spanner wrench for installing and removing seal 1.. The casing 11 and seal 16 may be fabricated from nylon, Delrin, Delrin AF, or other suitable plastics. In addition to the material of the seal being selected from any of the foregoing plastics, it may also be fabricated from teflon, or from other suitable plastic, such that the seal will provide the best sealing capabilities for the specific liquid used in the device.

Prior to installing seal 16 in the position shown in FIG. 1, the cylindrical chamber 22 of casing 11 is filled with a suitable fluid 23, as defined above, and the seal 16 with piston member 24 installed in bore 25 thereof is screwed into casing section 13. A dampening head 26 may be provided on the inner end of piston member 24. Piston member 24 is termed a piston if the device is a fluid spring, and it is termed a piston rod if the device is a shock absorber.

When seal 16 is in its fully installed position, an annular shoulder 27, which preferably extends at 45° to the horizontal but may be at any other suitable angle, will be in abutting relationship with annular shoulder 29 of casing section 13 to provide good sealing relationship. A portion of casing section 13 has an annular relief groove 30 adjacent mating annular shoulders 27 and 29 to lessen the stress concentration at the threads in this area. An annular groove 31 is provided in annular seal portion 32 for receiving an 0-ring or the like, when it is required for good sealing. However, in view of the fact that pressurized fluid exists in chamber 33, the hydrostatic pressure will force annular seal portion 32 into tight mating engagement with the inner wall of casing 11 to provide good fluid-tight contact. The same hydrostatic pressure will also force annular seal lip 34 into tight mating engagement with piston 24.

A cylindrical metal housing 35 is installed on casing 11 by sliding it from right to left in FIG. 1 until it reaches the position shown therein wherein internal annular shoulder 36 of housing 35 is in abutting relationship with annular shoulder 14. Housing 35 includes a smaller diameter section 37 which is in sliding engagement with the external surface 39 of casing section 11. Housing 35 also includes a larger housing section 40 which is in sliding engagement with the external surface 41 of casing section 13.

After housing 35 has been moved to the position shown in FIG. 1, a circular abutment member or plug 42 is slid from left to right in FIG. 1 until it occupies the position shown therein. Thereafter, set screws 43, which were previously inserted into plug 42 with their heads 44 below the outer periphery 45 of plug 42, are screwed outwardly until heads 44 enter apertures 46 to retain plug 42 in position. It will be appreciated that while only two screws 43 are shown, any required number may be placed circumferentially on plug 42. Alternatively, plug 42 could be threaded directly into sleeve 35 if a threaded attachment is desired.

The combination of the length of piston 24 and the location of the abutment surface 38 of plug 42 will determine the amount of penetration of piston 24 into casing 11, and thus will determine the amount of preload on the fluid 23. Furthermore, plug or abutment member 42 not only prevents piston 24 from being ejected from casing 11, but also prevents the end 47 of dampening member, if used, from striking against the end 49 of seal 16. The spaced position or dampening head 26 is the preferred position for providing a fluid amplified flow and a 90% efficient dampening curve of a plastic liquid spring shock. It should be further noted that contrary to the use of metal cylinder in liquid springs, which deflects 1/10 that of plastics, the greater yield of the plastic cylinder can be used to provide a pressure responsive flow between head 26 and cylinder bore 22.

As axial forces are applied to the energy absorber device 10, housing 35 will slide axially relative to casing 11. Because of the sliding connection, housing 35 will maintain piston 24 in a perfectly rectilinear path, thereby avoiding undue wear on the bore 25 of seal 16. While housing 35 shows sections 37 and 40, it will be appreciated that under certain conditions section 37 may be eliminated. Section 37 of the metal housing, if properly fitted to cylinder surface 39, will restrain outward deflection of plastic cylinder wall 11, thus restricting pressure responsive flow by fluidic shock head 26. This increases the shock force and the energy capabilities of the device.

The preloading force is applied to shoulder 14 at the enlarged cylindrical section 13 which has the capability of carrying this loading because of the greater amount of material which it contains. In addition, the larger section 13 has the capability of absorbing the radial stress which is due to the threads 17 and 19. Preferably the threaded seal member 16 is fabricated from a material having a slightly greater modulus of elasticity than casing 11 so that the hydrostatic forces applied to seal 16 can be distributed uniformly through threads 17 to threads 19. It is not necessary that the modulus of elasticity of seal 16 be greater than the modulus of elasticity of casing 11, but it is required that the moduli of elasticity be at least substantially the same. If they varied greatly from each other, as would be the case between a metal cylinder and a plastic seal, the unequal stretching under the foregoing circumstances would result in rupture of the threads on the seal. The reverse is also true. A conventional metal retainer cap used with a separate plastic seal in tests resulted in the threads 17 of the plastic cylinder failing prematurely.

It will be appreciated that a casing, such as 11, can be constructed with sections 12 and 13 being of the same diameter and with housing 35 being secured to casing 11 by attachments other than abutting shoulders 13 and 14. However, the illustrated construction with shoulders 13 and 14 not only provides an excellent construction for facilitating assembly but also provides a construction which conserves material, because a lesser thickness of material is required at section 11.

The above described construction lends itself to standardization in that standard casings 11 may be provided which will accept standard seals, such as 16, having different size bores therein to accommodate different sizes of pistons 26. In addition, different length housings 35 may be mounted on casing 11 to vary the dimensions of the energy absorber device 10 for different applications. Furthermore, as mentioned briefly above, the position of abutment surface 38 of abutment member or plug 42 may be varied so as to obtain a predetermined amount of preload of fluid 23. The foregoing discussed capabilities are present in addition to the basic concept of providing a fluid energy absorber device with a screw-in plastic seal which is economical for short-run production, as well as being economical for test purposes because there is no requirement for fabricating and possibly subsequently modifying expensive molds for producing a casing 11 with an integrally molded seal.

While preferred embodiments of the present invention have been disclosed, it will be appreciated that it is not limited thereto, but may be otherwise embodied within the scope of the following claims.

What is claimed is:

1. An energy absorber device comprising a plastic casing having a first casing section of a first diameter and a second casing section of a second diameter which is larger than said first diameter, first shoulder means at the junction of said first and second casing sections, a housing having a housing section for sliding engagement with said second casing section, second shoulder means in said housing for engagement with said first shoulder means, abutment means on said housing, a seal in said casing, fluid in said plastic casing, and piston means extending through said seal and having an end in engagement with said abutment means.

2. An energy absorber device comprising a plastic casing having a first casing section of a first diameter and a second casing section of a second diameter which is larger than said first diameter, first shoulder means at the junction of said first and second casing sections, a housing having a first housing section for sliding engagement with said first casing section and having a second housing section for sliding engagement with said second casing section, second shoulder means on said housing for engagement with said first shoulder means, abutment means on said housing, fluid in said plastic casing, a seal in said casing, and piston means extending through said seal and having an end in engagement with said abutment means.

3. An energy absorber device as set forth in claim 2 wherein said second shoulder means is at the junction of said first and second housing sections.

4. An energy absorber device comprising a plastic cylinder having first and second ends, first means closing said first end, a plastic seal member having external threads thereon, internal threads at said second end for receiving said external threads, fluid in said cylinder, piston means, a bore in said plastic seal member for receiving said piston means, said cylinder having a first diameter at said first end and a second diameter which is larger than said first diameter in the area of said internal threads, a shoulder at the junction of said first and second diameters, a housing mounted on said second end and extending outwardly beyond said second end, and a second shoulder on said housing for abutting engagement with said shoulder.

5. An energy absorber device as set forth in claim 4 wherein said piston includes a first end in said cylinder and a second end external of said cylinder, and abutment means on said housing for engagement by said second end of said piston.

6. An energy absorber device as set forth in claim 5 including fastening means for detachably securing said abutment means to said housing.

7. An energy absorber device comprising a plastic cylinder having first and second ends, first means closing said first end, a plastic seal member having external threads thereon, internal threads at said second end for receiving said external threads, fluid in said cylinder, piston means, a bore in said plastic seal member for receiving said piston means, a housing, means slidably mounting said housing on said cylinder, said housing extending outwardly beyond said second end, first shoulder means on said cylinder, second shoulder means on said housing for abutting engagement with said first shoulder means, a first end on said piston with said first end being located in said cylinder, a second end on said piston located externally of said cylinder, and abutment means on said housing for engagement by said second end of said piston.

8. An energy absorber device as set forth in claim 7 including fastening means for detachably securing said abutment means to said housing.

9. An energy absorber device as set forth in claim 7 wherein said plastic seal member has a greater modulus of elasticity than said cylinder.

10. An energy absorber device as set forth in claim 9 including an internally relieved portion at the end of said internal threads facing said first end of said cylinder.

11. An energy absorber device as set forth in claim 10 including fastening means for detachably securing said abutment means to said housing.

12. An energy absorber device as set forth in claim 10 wherein said plastic seal member has a greater modulus of elasticity than said cylinder.

13. An energy absorber device as set forth in claim 11 including an internally relieved portion at the end of said internal threads facing said first end of said cylinder.

* * * * *

UNITED STATES PATENT AND TRADEMARK OFFICE
CERTIFICATE OF CORRECTION

PATENT NO. : 4,793,451

DATED : December 27, 1988

INVENTOR(S) : Paul H. Taylor

It is certified that error appears in the above-identified patent and that said Letters Patent is hereby corrected as shown below:

Column 5, line 9 (claim 1), change "in" to --on--.

Column 6, line 31 (claim 10), change "9" to --7--.

Signed and Sealed this

Fourth Day of July, 1989

Attest:

DONALD J. QUIGG

Attesting Officer

Commissioner of Patents and Trademarks